United States Patent Office 2,757,455
Patented Aug. 7, 1956

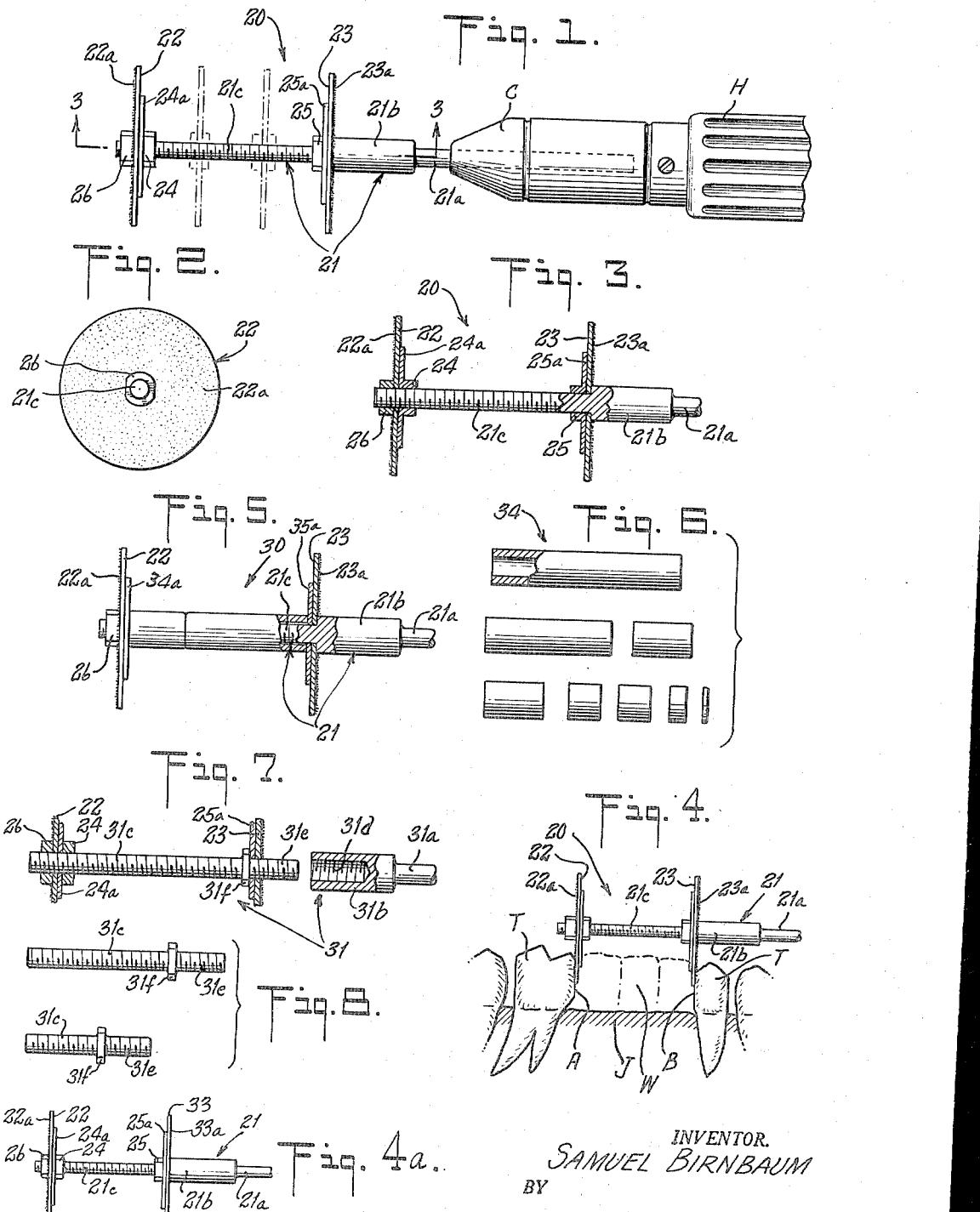

2,757,455

CUTTING MEANS FOR PREPARING NATURAL TEETH FOR BRIDGEWORK

Samuel Birnbaum, Ossining, N. Y.

Application August 7, 1953, Serial No. 372,949

2 Claims. (Cl. 32—59)

This invention relates to fixed bridgework dentistry and more particularly to the preparation of the natural teeth as parallel abutments between which bridgework is attached and an improved rotary drill cutting means for obtaining parallelism of abutment surfaces of said natural teeth in an occluso-gingival direction to enable proper alignment seating or fitting of the bridgework with a minimum requirement of skill and manual manipulation.

Among the objects of the invention is to generally improve the method of operation and construction of said cutting means of the character described, which shall have said cutting means comprise few and simple parts that are readily assembled for use in obtaining parallelism of said natural teeth abutment surfaces, which shall provide for easing the insertion and increase retention of the bridgework, which shall conserve the natural tooth structure, which cutting means shall be relatively cheap to manufacture, which shall require a minimum of skill and yet assure certainty of producing the results desired, which shall provide an improved simplified method of operation, and which shall be practical and efficient to a high degree in use.

Other objects of the invention will in part be obvious and in part hereinafter pointed out.

The invention accordingly consists of features of construction, combinations of elements, arrangements of parts and steps in the method which will be exemplified in the constructions and methods hereinafter described and of which the scope of application will be indicated in the claims following.

In the accompanying drawing in which is shown various possible embodiments of the invention:

Figs. 1 and 2 are side elevational and end views, respectively, of an improved rotary drill cutting means constructed to embody the invention attached for operation to the leading end of a conventional manually operated power driven drill head, only a fragmentary portion of the latter being shown in Fig. 1.

Fig. 3 is a cross-sectional view taken on line 3—3 in Fig. 1 showing details of the assembly mounting of the adjustably spaced apart parallelly aligned grinding discs on the arbor shaft or mandrel of said improved cutting means.

Fig. 4 is a side elevational view of the cutting means shown in Figs. 1 and 3 in position during the preparation for fitting bridgework with the two parallelly aligned grinding discs shown simultaneously cutting parallel slices occluso-gingivally on the natural teeth abutment sides in practicing the invention, only a fragmentary portion of the jaw structure and teeth, one of the latter inclined, being shown.

Fig. 4a is a side elevational view like Fig. 4 except showing a single grinding disc for slice cutting only one tooth abutment during the preparation for fitting bridgework.

Fig. 5 is a side elevational view of another form of rotary drill cutting means like that shown in Figs. 1 and 3, except that the cutting discs are separated, that is, spaced apart a predetermined distance in parallel alignment by one or more sleeve shaft spacers as required for grinding the parallel slices occluso-gingivally on the teeth abutment sides as is clear from Fig. 4.

Fig. 6 is a side view showing a set of sleeve shaft spacers of different lengths for use in the assembly of the cutting means shown in Fig. 5.

Fig. 7 is a side elevational view of a multi-part spindle or shaft for forming a rotary drill cutting means like that shown in Figs. 1, 4 and 5, constructed when assembled to embody the invention, and Fig. 8 is a side elevational view of different lengths of spindle parts which with that shown in Fig. 7 forms a set to cover the range of distances to span one, two or three missing teeth.

The requirement of fixed bridgework seldom presents the natural teeth with parallel abutment surfaces so that bridgework can be fitted for attachment therebetween. The inclination, rotation extrusion of teeth, etc., is usually due to neglect in replacement as a result of which complications in the most desirable proper seating of the bridgework arise due to a lack of occluso-gingival parallelism.

Such parallelism of abutments for fixed bridgework is generally approached as taught by geometric axioms and has been found to give rise to uncertainty as to the final outcome because a relatively high degree of skillful manipulation is frequently required to prepare for such desired seating. Heretofore, having experienced the anguish of failure, a dentist usually abandons the use of fixed bridgework for either the fixed-moveable type or resorts to a completely removeable denture. Neither of these have been found satisfactory in many cases but rather than construct fixed bridgework which cannot readily be inserted because of lack of occluso-gingival parallelism, said other types of bridgework are substituted to avoid failure, embarrassment and loss of prestige.

Since there is no compromise with said parallelism in an occluso-gingival direction in order to seat said bridgework, parallel slicing clearance of the preparation can be accurately and precisely accomplished by the improved method and cutting means herein described and shown, thus aiding to instill confidence in this class of dentistry and eliminating guesswork in securing said parallelism.

Referring in detail to the drawing, 20 denotes a rotary drill cutting means constructed to embody the invention and, as shown in Fig. 1, said cutting means 20 is attached for operation to a leading end of a conventional manually directed drill head H of any well understood construction.

Said cutting means 20 may comprise a drive shaft portion or stem 21a of a mandrel 21 sized to extend into and to be detachably secured to turn with chuck head C of drill head H on supply of power in the well known manner, and suitable means for replaceably mounting in spaced apart parallelly aligned relation a pair of grinding discs 22 and 23, as shown in Figs. 1 to 4. Said last mentioned means may include an assembly of an enlarged diameter spindle portion 21b of drive shaft stem 21a which extends beyond chuck head C for clamp bracing inner disc 22 against said spindle portion 21b, an arbor portion 21c screw threaded along the entire length thereof, backing nuts 24 and 25 for inner and outer grinding discs 22 and 23, respectively, and a finial or terminating clamp nut 26, said arbor portion 21c extending in axial alignment with said enlarged spindle portion 21b of drive stem 21a.

Backing nuts 24 and 25 and clamp nut 26 each are mounted to be screwed along arbor portion 21c, backing nuts 24 and 25 being provided with radially extending flanges 24a and 25a for bracing the rear or smooth sides of discs 22 and 23, respectively, opposite the grinding or abrasive surfaces 22a and 23a thereof, respectively, as is clear from Figs. 1 to 4.

Mandrel 21 constructed as above described and assembled with backing nuts 24 and 25 and clamp nut 26 rigidly supporting grinding discs 22 and 23 in parallelly aligned planes for rotation with drill chuck head C and have disc abrasive surfaces 22a and 23a thereof positioned a desired spaced apart distance as required for simultaneously cutting parallel slices occluso-gingivally on sides A and B of surface abutments of natural teeth T between and against which permanent bridgework W (indicated in dot and dash lines in Fig. 4) is secured by means of required anchoring grooves and pits (not shown) provided in the natural teeth T in the well understood manner.

The utility and improved method of practicing the invention will now be apparent.

Assuming that a jaw J with three natural teeth missing is to be provided with a replacement of permanent bridgework W between the natural teeth T, as shown in Fig. 4, since said teeth T have abutment surface sides A and B thereof that require occluso-gingival alignment for said bridgework W due to the inclination of one or both of said teeth T, rotary drill cutting means 20 is assembled, as is clear from Figs. 1 to 4 and described above, with the abrasive surface sides 22a and 23a of grinding discs 22 and 23, respectively, parallelly secured to an adjusted distance spaced apart sufficient to snugly fit the space between teeth T to be slice cut. On inserting said spaced apart discs 22 and 23 between the teeth T in occluso-gingival alignment and applying effective grinding power to rotate said discs 22 and 23, the desired parallel slicing of the teeth sides at A and B is either simultaneously produced or during the slight movement of said cutting means in an axial direction to and from said teeth sides A and B and to and from the jaw J. This movement is continued until at least one of said surface sides A and B is ground to provide a flat abutment surface area of desired extent, as for example at B. Grinding disc 23 may then be replaced by a smooth disc 33, as shown in Figs. 4a, and slicing movement continued until surface side A is ground to a flat abutment surface area of desired extent in parallel with surface side B ready for fitting permanent bridgework W after cutting any necessary grooves in said teeth sides A and B in the direction created by slice grinding to assure parallel abutments.

Thus, ease of insertion and increased retention of the bridgework W is achieved due to parallel alignment of surface sides A and B, abutment conservation of tooth structure being also evident by elimination of excessive tapering abutment walls in the heretofore attempt to overcompensate for inexactitude of the relied upon eye perspective and uncertainty of parallel abutment walls.

From the above description, it is now clear that the improved method includes the steps of inserting between spaced apart natural teeth T parallelly aligned grinder discs 22 and 23 which, on rotation, are moved a minimum distance to slice cut the natural teeth T for forming abutment surface side areas A and B extending in parallel occluso-gingival relation predetermined to correspond to a required fitting of said bridgework W for occupying the space therebetween. And where one of said tooth surface sides A or B have been ground to have a flat abutment finished surface area of desired extent before the other tooth surface side, the corresponding grinder discs 22 and 23 are replaced by a smooth disc to allow said finished tooth surface side area to remain intact and serve as a guide for cutting parallel slices occluso-gingivally on the tooth surface side area of said other tooth until the latter has been ground to have a desired flat abutment finished surface area.

In Figs. 5 and 6, a modified form of cutting means is shown at 30, which besides mandrel 21 formed with drive stem 21a, enlarged portion 21b, arbor portion 21c and finial clamp nut 26, may be provided with a set of sleeve spacers 34 slidingly fitted over arbor portion 21c. Said spacers 34 serve in place of backing nuts 24 and 25 to position grinding discs 22 and 23 with abrasive sides 22a and 23a in desired spaced apart relation to parallelly slice grind said abutment surface sides A and B.

Cutting means 30 may be assembled by first positioning grinding disc 23a against enlarged portion 21b of mandrel 21, then selecting a proper length of sleeve spacer or proper lengths thereof from the set 34, shown in Fig. 6. Said selected sleeve spacer or spacers 34 are mounted between inner grinder disc 22 and outer disc 23 and finial clamp nut 26 applied to rigidly secure the assembly together. If desired, backing washers 34a and 35a may be provided for bracing said discs 22 and 23, respectively, as shown in Fig. 5. The slice grinding of tooth abutment surface sides A and B can be carried out in the same manner and method as described above for cutting means 20 and as is clear from Fig. 4.

In Fig. 1, in dot and dash lines, there is indicated two different positions for outer grinder disc 23 which is placed to correspond to spaces between natural teeth T left by one and two missing teeth to be replaced by bridgework W. For convenience of operation, cutting means 20 may be furnished for use in a set of three identical constructions except that arbor portion 21c is made of a length to correspond to required bridgework W replacing one, two or three missing teeth, as indicated by the full and dot and dash lines of said outer disc 23.

In Figs. 7 and 8, a modified form of mandrel is shown at 31 which is like mandrel 21 described above for cutting means 20 and 30 shown in Figs. 1 and 5, respectively, except that mandrel 31 is of multipart construction and may comprise drive stem 31a having enlarged portion 31b axially threaded at 31d which forms one part of mandrel 31 for attaching screw stud 31e terminating one end of arbor length 31c which forms the other part of the mandrel 31. Stud 31e has a clamp shoulder or enlarged headed portion 31f formed on a mid-portion of arbor length 31c. By clamping a grinding disc, such as, 23, between clamp shoulder 31b and enlarged portion 31f on screwing stud 31e into axial thread 31d and clamp mounting another grinding disc, such as, 22, spaced from disc 23 between backing nut 24 and finial nut 26 on arbor portion 31c, as assembled construction similar to that shown in Figs. 1 and 4 is formed and can be used in the same manner as described above. With mandrel 31, assembly of the grinding discs 22 and 23 with arbor portion 31c may be held in readiness for convenient use in sets for preparing permanent bridgework to replace one, two or three missing teeth.

It is also apparent that mandrel arbor portion 31c can be readily assembled to use sleeve spacers like those forming the set 34 and shown in Figs. 5 and 6 for spacing apart the grinding discs 22 and 23 desired distances. Likewise, backing washers 34a and 35a may be formed as an integral flange terminating one end of sleeve spacers 34, and flanges 24a and 25a may be provided detached from backing nuts 24 and 25 in the form of washers or discs, as is clear from Fig. 7.

It will thus be seen that there are provided an improved method for preparing natural teeth for bridgework and cutting means constructions in which the several objects of the invention are achieved and which are well adapted to meet the conditions of practical use.

As various other possible embodiments of the invention might be made of the above invention, and as various changes in the embodiments above set forth might be made, it is to be understood that all matters herein set forth or shown in the accompanying drawings and described in the specification are to be interpreted as illustrative and not in a limiting sense.

Having thus described my invention, I claim as new and desire to secure by Letters Patent:

1. A dental device of the character described for preparing spaced apart natural teeth for permanent bridgework replacing missing teeth comprising a rotatable mandrel formed with an axially extending arbor portion, spaced apart parallelly aligned grinding discs secured to turn with said arbor portion, said discs having abrasive surfaces facing away from each other for slice cutting said natural teeth to form abutment surface side areas extending in parallel occluso-gingival relation relation predetermined to correspond to said bridgework, an interchangeable sleeve spacer means positioned on the arbor portion for retaining the spaced apart distance between said discs.

2. A dental device as defined in claim 1 in which said arbor portion is detachably connected to a drive stem of said mandrel for removal with said discs, one of said grinding discs being replaceable by a smooth surface non-abrasive disc so that only one of the natural teeth is subjected to slice cutting for producing an abutment surface side area.

References Cited in the file of this patent

UNITED STATES PATENTS

| | | |
|---|---|---|
| 1,322,644 | Steiner | Nov. 25, 1919 |

FOREIGN PATENTS

| | | |
|---|---|---|
| 525,427 | Germany | May 23, 1931 |